United States Patent [19]

Grimes

[11] Patent Number: 5,060,302
[45] Date of Patent: Oct. 22, 1991

[54] AUTOMATIC ADJUSTMENT OF OPTICAL POWER OUTPUT OF A PLURALITY OF OPTICAL TRANSMITTERS

[75] Inventor: Gary J. Grimes, Thornton, Colo.

[73] Assignee: AT&T Bell Laboratories, Murray Hill, N.J.

[21] Appl. No.: 486,479

[22] Filed: Feb. 28, 1990

[51] Int. Cl.$^5$ ............................................. H04B 10/00
[52] U.S. Cl. ..................................... 359/135; 364/811; 359/154; 359/161; 359/174
[58] Field of Search ............... 455/601, 606, 607, 608, 455/617, 69, 603, 618; 370/4; 364/811, 822

[56] References Cited

U.S. PATENT DOCUMENTS

| | | | |
|---|---|---|---|
| 3,732,496 | 5/1973 | Boyer | 455/69 |
| 4,261,054 | 4/1981 | Scharla-Nielsen | 455/69 |
| 4,553,268 | 11/1985 | Tilly | 455/607 |
| 4,768,854 | 9/1988 | Campbell et al. | 350/96.16 |
| 4,856,011 | 8/1989 | Shimada et al. | 455/608 |
| 4,868,809 | 9/1989 | Kahn | 370/4 |

FOREIGN PATENT DOCUMENTS 0014681 1/1989 Japan .................................... 364/811
2219165 11/1989 United Kingdom ................ 455/613

OTHER PUBLICATIONS

Toshifumi Tamura, Masuru Nakamura, Shigeru Ohshima, Takao Ito, and Takeshi Ozeki, "Optical Cascade Star Network—A New Configuration for a Passive Distribution System with Optical Collision Detection Capability", *IEEE Journal of Lightwave Technology*, vol. LT-2, No. 1, Feb. 1984, pp. 61–66.

Primary Examiner—Reinhard J. Eisenzopf
Assistant Examiner—Kinfe-Michael Negash
Attorney, Agent, or Firm—John C. Moran

[57] ABSTRACT

An apparatus for automatically adjusting the optical power output of multiple optical transmitters. Each of the optical transmitters is optically interconnected to a common optical repeater. The optical repeater is responsive to optical signals received from each optical transmitter to adjust the optical output levels of these optical transmitters to a common level by transmitting signals back to the optical transmitters. The optical repeater commences the adjustment procedure upon detection that one or more of the optical transmitters is transmitting above or below a predefined power level.

16 Claims, 3 Drawing Sheets

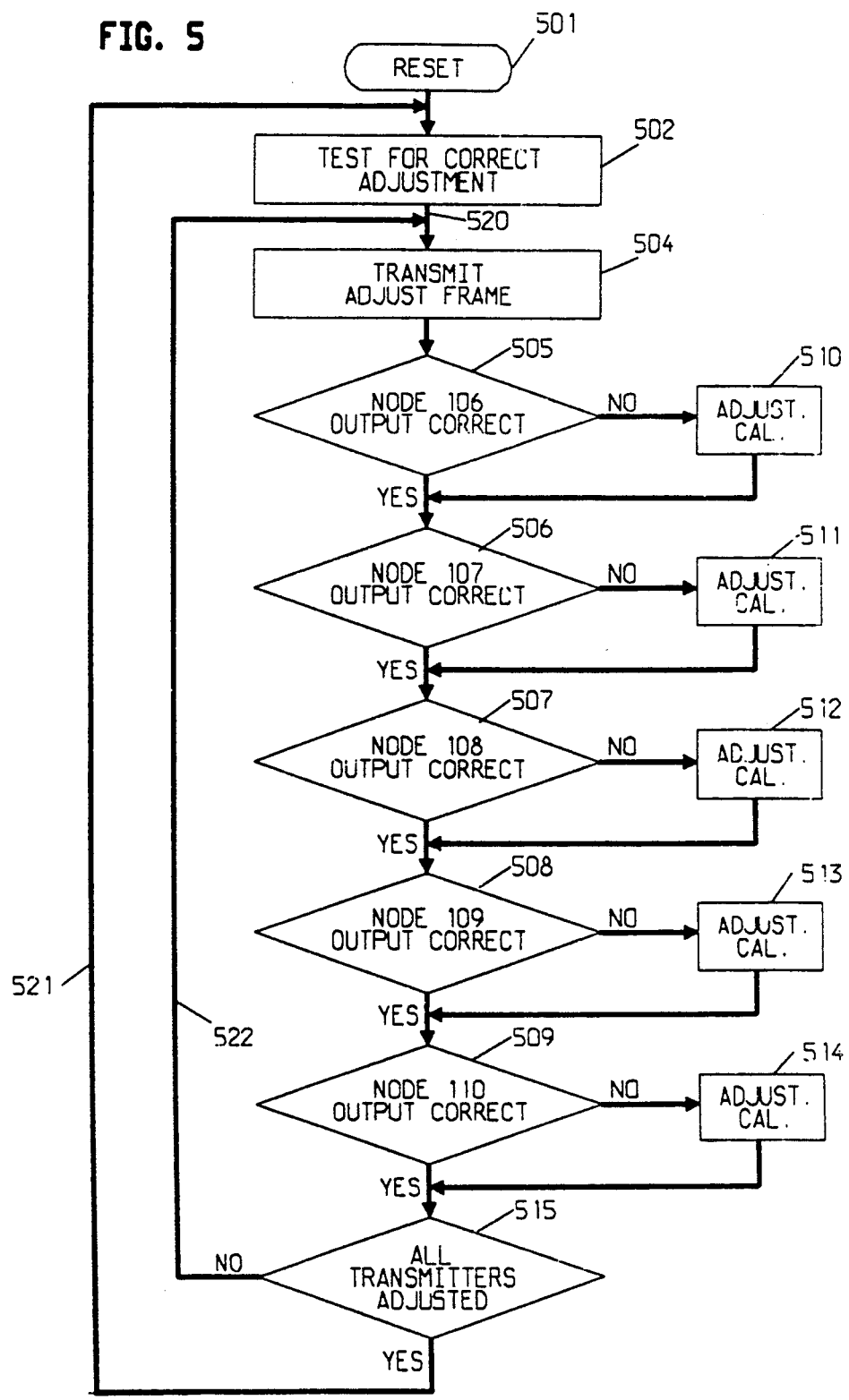

AUTOMATIC ADJUSTMENT OF OPTICAL POWER OUTPUT OF A PLURALITY OF OPTICAL TRANSMITTERS

TECHNICAL FIELD

The present invention relates to the transmission of light in an optical fiber and, more particularly, to the adjustment of the optical power output of a plurality of optical transmitters interconnected to an optical bus.

BACKGROUND OF THE INVENTION

In many optical local area networks (LANs) and optical backplanes having a bus-type architecture, an optical repeater receives and combines optical signals from optical transmitters in system nodes, amplifies, and individually retransmits back to optical receivers in the system nodes. One of the major problems is that an optical receiver in the optical repeater has difficulty in accurately receiving digital information from multiple transmitters which are transmitting at different optical power output levels. The optical power levels received from typical optical transmitters may differ by a few dB in optical level. The difference in optical power levels received at the optical repeater is different not only because the light emitting diodes (LEDs) or lasers, which are used as light sources differ in their outputs, but also because these light sources are connected to the optical repeater via connectors, optical couplers, and interconnecting optical fibers which can introduce optical power losses.

The problem created by received signals having varying optical power levels is the difficulty of distinguishing by the optical receiver between logical "1's" or "0's" from the various optical transmitters. Optical receivers are of two types: dc coupled and ac coupled. If a receiver is of the dc coupled type, it is very difficult to find a common threshold which allows adequate noise margins for different levels of transmitted signals. If the receiver is of the ac coupled type using edge differentiation, adjacent bits corresponding to the "1" state from different transmitters can cause a problem. If two adjacent bits are both a "1" logic signal but at two different optical power levels, there is a significant "edge" or transition in amplitude between the two adjacent "1" logic levels; and the receiver's edge detection mechanism incorrectly interprets that as a transition between logical values.

SUMMARY OF THE INVENTION

A departure in the art is achieved by an apparatus and method for automatically adjusting the optical power output of multiple optical transmitters. The optical transmitters are optically interconnected to a common optical repeater. In response to optical signals received from optical transmitters which exceed a predefined difference from a predefined output level, the optical repeater transmits adjustment signals back to the optical transmitters to adjust the optical output levels of those optical transmitters to the predefined level.

The optical repeater is interconnected to system nodes via optical fibers. Each system node contains one optical transmitter and one optical receiver for receiving optical signals from the optical repeater. Communication between system nodes is done via the optical repeater and optical fibers. During communication between system nodes, the repeater continuously samples the output signals of the optical transmitters and compares those samples against the predefined optical output level. If the difference between the output signal of an optical transmitter and the predefined output level exceeds the predefined difference, the optical repeater calculates and transmits adjustment signals to that optical transmitter.

In one specific embodiment of the invention, communication between system nodes is done on the basis of an information frame which is transmitted via the optical repeater and optical fibers. Each system node is assigned a particular time slot in the frame, and there are two types of frames. Data frames are used to communicate data between system nodes, and adjustment frames are used to communicate adjustment information to the optical transmitters by the optical repeater. The optical repeater continuously samples each time slot of each data frame to determine when an optical transmitter has exceeded the prefined difference. When an optical transmitter exceeds the predefined difference, the optical repeater sends adjustment information to that optical transmitter in its assigned time slot using an adjustment frame.

Other and further aspects of the present invention will become apparent during the course of the following description and by reference to the accompanying drawing.

BRIEF DESCRIPTION OF THE DRAWING

Referring now to the drawing:

FIG. 5 illustrates, in flow chart form, a program for controlling the operation of an adjustment formatter.

DETAILED DESCRIPTION

Figure 1:
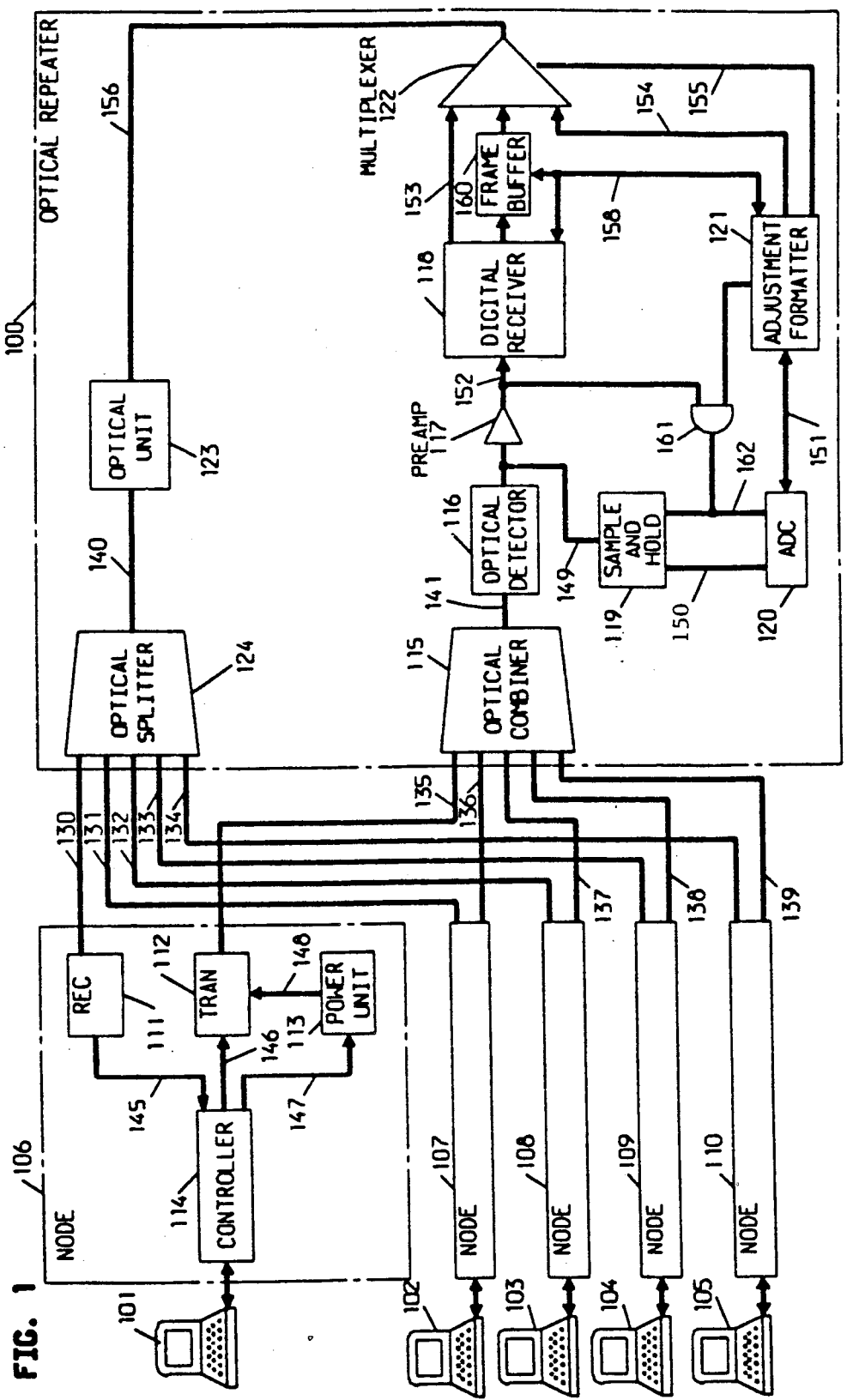
FIG. 1 illustrates an optical transmission system in accordance with the present invention.

In the optical transmission system illustrated in FIG. 1, nodes 106 through 110 transmit and receive optical signals via optical repeater 100 and optical fibers 130 through 139. Optical repeater 100 receives and combines optical signals from optical fibers 135 through 139 and redistributes these optical signals via optical fibers 130 through 134. In accordance with the invention, optical repeater 100 monitors the optical levels received from each of the nodes and as required transmits to the nodes adjustment information to adjust these levels. Also, optical repeater 100 performs these adjustments at system initialization time.

Figure 4:
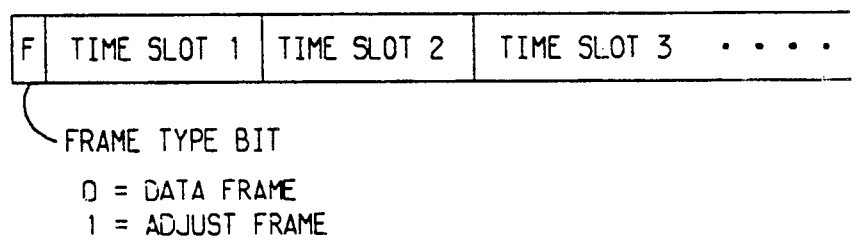
FIG. 4 illustrates the format of the frames communicated between the nodes and an optical repeater.

In the transmission system illustrated in FIG. 1, each node has a preassigned time slot for receiving information. Nodes 107 through 110 are identical to node 106 in internal construction. Nodes 106 through 110 are interconnected individually to terminals 101 through 105, respectively, and are assigned time slots 1 through 5 of FIG. 4, respectively. As illustrated in FIG. 4, there are two types of frames used to communicate information in the optical transmission system of FIG. 1. Normal (also referred to as data) frames are used for the interexchange of information between nodes, and adjustment frames are used by optical repeater 100 to transmit adjustment information to nodes. During the normal operation of the transmission system illustrated in FIG. 1, nodes 106 through 110 interexchange information by a node inserting information for another node into the other node's time slot of the frame illustrated in FIG. 4. For example, if nodes 110 and 106 are to interexchange information from their terminals, node 110 inserts information into time slot 1 and reads time slot 5. Similarly, node 106 inserts information into time slot 5 and reads time slot 1. Nodes 106 and 110 transmit information on optical fibers 135 and 139, respectively; and read information from optical fibers 130 and 134, respectively.

Optical repeater 100 receives the optical signals on optical fibers 135 through 139 and combines these signals together using optical combiner 115. The output of optical combiner 115 is then converted to an electrical signal by optical detector 116. The converted electrical signal is transmitted to preamp 117 via conductor 149 and from there to digital receiver 118 which performs digital processing on the signal. A digital signal from digital receiver 118 then is transferred to optical unit 123 via conductor 153, multiplexer 122, and conductor 156. Optical unit 123 is responsive to this digital signal to generate an optical signal and transfer that signal via optical fiber 140 to optical splitter 124. Optical splitter 124 then transmits the received optical signal to nodes 106 through 110 via optical fibers 130 through 134, respectively. During normal/data operation, the frame type bit is equal to "0" as illustrated in FIG. 4 signify the communication of data between nodes.

Figure 2:
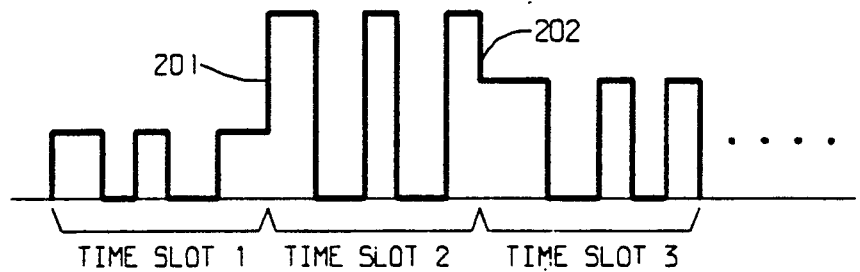
FIG. 2 illustrates the unadjusted signals of the nodes of FIG. 1.

FIG. 2 illustrates the optical signals received by combiner 115 when the transmitters in nodes 106 through 110 are operating at different optical power output levels. By continuously sampling signals in data frames using sample-and-hold 119 and analog-to-digital converter 120, adjustment formatter 121 detects when an unacceptable difference between the received power levels and predefined power level has occurred. Upon occurrence of an unacceptable difference, formatter 120 initiates the following steps to buffer the next data frame and to transmit an adjustment frame containing adjustment information to the nodes. Formatter 120 transmits a signal via conductor 155 to multiplexer 122. In response to that signal, multiplexer 122 selects signals from formatter 121 via conductor 154 at the end of the current frame. Formatter 121 will transmit the adjustment frame via conductor 154. Formatter 121 next enables frame buffer 160 via cable 158 to store the next frame received from nodes 106 through 110. Frame buffer 160 prevents the next frame from being lost due to the transmission of an adjustment frame. Formatter 121 then transmits the adjustment frame which contains a "1" in the frame type bit as illustrated in FIG. 4.

The manner in which all nodes respond to each adjustment frame is described with respect to node 106. Normally, controller 114 takes information from terminal 101 and transfers it to transmitter 112. However, after the adjustment frame is received and processed by receiver 111, the information in time slot 1 is transferred via conductor 145 to controller 114. Controller 114 is responsive to this frame to transmit alternate logical "1's" and "0's" data to transmitter 112. The latter transmitter inserts this data into time slot 1 under control of controller 114. In addition, controller 114 signals terminal 101 that data transmission has temporarily halted. No data being communicated to or from terminal 101 is lost by transmission of the adjustment frame.

Before the return adjustment frame is received at repeater 100 via optical fiber 135, formatter 121 enables AND gate 161 via conductor 157. When preamp 117 generates a signal on conductor 152 within the range of a "1", the output of optical detector 116 is stored by sample-and-hold 119 under control of AND gate 161 responding to the signal on conductor 152. Analog-to-digital converter 120 then converts the stored output. Formatter 121 is responsive to the output of converter 120 to calculate adjustment information.

In the next frame, adjustment formatter 121 transmits back to controller 114 adjustment information in time slot 1 to adjust the output of transmitter 112 to the predefined level. Controller 114 is responsive to this adjustment information to transmit via conductor 147 the required adjustments to power unit 113 which controls the power level of transmitter 112 via conductor 148. Formatter 121 continues to transmit adjustment frames until the output level of transmitter 112 reaches the predefined level. This process is repeated until all of the nodes are transmitting at the predefined level.

After the adjustment has been accomplished, formatter 121 signals multiplexer 122 via conductor 155 to select the output of frame buffer 160. This allows the last data frame received before the adjustment procedure was initiated to be transmitted to nodes 106 through 110. After transmission of the contents of buffer 160, formatter 121 signals multiplexer 122 to select the output of digital receiver 118 via conductor 153, and data operations resume.

Adjustment formatter 121 is implemented utilizing a microprocessor with appropriate peripheral circuits. FIG. 5 illustrates the program executed by formatter 121 in adjusting the output power of the transmitters in nodes 106 through 110. Block 502 monitors each data frame to detect a transmitter that is transmitting at an improper level. To detect such a level, formatter 121 monitors the returning data frame received via optical fibers 135 through 139 of FIG. 1. Digital receiver 118 signals the start of each frame and the start of each time slot within a frame via cable 158. When formatter 121 receives information from digital receiver 118 indicating the start of a time slot, formatter 121 enables AND gate 161 via conductor 157 so that when preamp 117 outputs a "1", the output of optical detector 116 is stored by sample-and-hold circuit 119 under control of AND gate 161. The output of sample-and-hold circuit 119 is communicated to analog-to-digital converter 120 via conductor 150. Converter 120 converts the analog signal to a digital word which is communicated to formatter 121 via bus 151. Formatter 121 compares the digital word to the predefined level. Formatter 121 performs these operations for each of the time slots. Upon detection of an improper level by formatter 121, control is transferred to block 504.

Upon receiving control, block 504 transmits the adjustment frame illustrated in FIG. 4. For each time slot, formatter 121 enables elements 116 through 120 and element 161 to convert the analog signal from optical detector 116, corresponding to a digital "1", to a digital word. Formatter 121 uses each of the resulting digital words to determine if the transmitter of that word needs adjustment. For example, formatter 121 is responsive to the digital word for time slot 1 from analog-to-digital converter 120 to determine by execution of decision block 505 whether the output of transmitter 112 is operating at the correct power level. If the output is not operating at the correct power level, control is passed to block 510 which calculates an adjustment value. Formatter 121 then inserts the adjustment value into time slot 1 of the next frame by controlling multiplexer 122 via conductor 155.

After the next adjustment frame is received by receiver 111, controller 114 is responsive to the adjustment value in time slot 1 to control power unit 113 to adjust the output of transmitter 112. Formatter 121 performs the same type of operations for nodes 107 through 110 utilizing the pairs of blocks 505 through 509 and 510 through 514, respectively.

Figure 3:
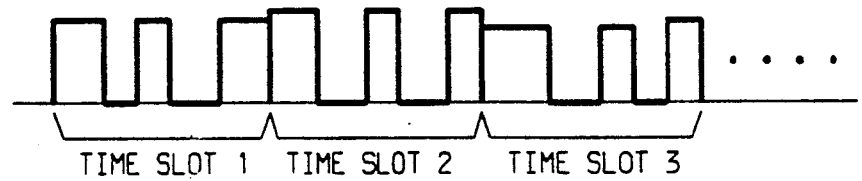
FIG. 3 illustrates the signals received from the nodes of FIG. 1 after adjustment.

Decision block 515 determines when all of the transmitters in nodes 106 through 110 are transmitting at substantially the same power level. If decision block 515 determines that one or more of the transmitters are not fully adjusted, control is transferred back to block 504 via path 522. Once all of the transmitters are transmitting at substantially the same power level as illustrated in FIG. 3, decision block 515 transfers control to decision block 502 via path 521.

In another embodiment of the invention, the program executed by formatter 121 is modified in the following manner. For each frame, block 502 calculates an average for all time slots of the sampled "1" levels. As previously described, formatter 121 uses elements 119, 120, and 161 to sample the output of optical detector 116 to acquire those sampled "1" levels. For each time slot of the next frame, formatter 121 compares the digital representation of the analog signal from optical detector 116 with the average from the previous frame. If the difference between the average and the sample exceed a predefined difference, control is transferred to block 504. Blocks 505 through 514 then determine which transmitters need adjustment by comparing samples to the average and calculate adjustment values for each transmitter whose output differs from the average by an amount greater than the predefined difference. Block 504 then transmits those values in an adjustment frame to the transmitters.

It is to be understood that the above-described embodiment is merely illustrative of the principles of the invention and that other arrangements may be devised by those skilled in the art without departing from the spirit and scope of the invention. In particular, it would be obvious to those skilled in the art to apply the invention to packet type transmission on a bus whereby adjustment values would be transmitted in a packet. In addition, the adjustment information has been disclosed as being an adjustment value; however one skilled in the art could readily devise a system where the adjustment information indicated that an optical transmitter's output should be increased or decreased by a predetermined amount. In such a system, repeated adjustment frames would be transmitted until a transmitter's output was within a predetermined range.

I claim:

1. A method for adjusting outputs of optical units interconnected to an optical repeater via a common optical communication path and said optical units communicate with each other via said common optical communication path and said optical repeater, comprising the steps of:
    sampling outputs of said optical units by said optical repeater;
    comparing by said optical repeater the samples of said outputs with a predefined optical output level;
    designating by said optical repeater one of said optical units for adjustment upon the difference between a sample of an output of said one of said optical units and said predefined optical output level exceeding a predefined difference; and
    transmitting by said optical repeater to said designated one of said optical units adjustment information for controlling the output level of said designated one of said optical units.

2. The method of claim 1 wherein said comparing step comprises the steps of:
    converting each of said outputs to an individual digital word; and
    testing the difference between each of said digital words and a digital representation of said predefined optical output level for being greater than a digital representation of said predefined difference.

3. The method of claim 1 wherein said step of transmitting comprises the step of calculating said adjustment information in response to said designation of said one of said optical units and said sample of said output of said one of said optical units.

4. A method for adjusting the outputs of a plurality of optical transmitters in an optical transmission system having optical units each comprising one of said optical transmitters paired with one of a plurality of optical receivers and said optical units interconnected to an optical repeater via an optical communication path and said optical units communicate with each other via said optical communication path and said optical repeater, said method comprising the steps of:
    detecting by said optical repeater that the differences between the outputs of a group of said optical transmitters and a predefined optical level exceed a predefined difference;
    transmitting adjustment values by said optical repeater to optical receivers paired with ones of said group;
    communicating said transmitted adjustment values by said optical receivers paired with said ones of said group; and
    controlling said outputs of said ones of said group in response to said communicated adjustment values.

5. The method of claim 4 wherein said step of detecting comprises the steps of:
    sampling outputs of said optical transmitters;
    comparing the samples of said outputs with said predefined optical output level; and
    designating each of said ones of said group for adjustment upon the difference between said sample of said output of each of said ones of said group and said predefined optical output level exceeding said predefined optical output level.

6. The method of claim 5 wherein said comparing step comprises the steps of:
    converting each of said outputs to an individual digital word; and
    testing the difference between each of said digital words and a digital representation of said predefined optical output level for being greater than a digital representation of said predefined difference.

7. The method of claim 6 wherein said step of transmitting comprises the step of calculating said adjustment values in response to said designation of said ones of said group and said samples of said outputs of said ones of said group.

8. The method of claim 7 wherein each of said pairs of said optical receivers and said optical transmitters is interconnected by a local bus and information is communicated on said optical communication path in information frames and each frame comprises a plurality of time slots and each of said optical receivers is assigned an individual time slot, said transmitting step comprises the step of inserting said adjustment values into assigned time slots of said optical receivers paired with said ones of said group.

9. The method of claim 8 wherein said information frames are grouped as data and adjustment frames and said transmitting step further comprises the step of indicating that the frame used for the transmission of adjustment values is an adjustment frame.

10. The method of claim 8 wherein said communicating step comprises the step of transferring each of said adjustment values between each pair of said ones of said group and said paired optical receivers via the local bus.

11. An apparatus for adjusting outputs of optical units interconnected to said apparatus by a common optical communication path and said optical units communicate with each other via said common optical communication path and said apparatus, said apparatus comprising:
   means for sampling outputs of said optical units;
   means for comparing the samples of said outputs with a predefined optical output level; and
   means for designating one of said optical units for adjustment upon the difference between a sample of an output of said one of said optical units and said predefined optical output level exceeding a predefined difference; and
   means for transmitting to said designated one of said optical units via said common optical communication path adjustment information for controlling the output level of said designated one of said optical units.

12. The apparatus of claim 11 wherein said comparing means comprises
   means for converting each of said outputs to an individual digital word; and
   means for testing the difference between each of said digital words and a digital representation of said predefined optical output level for being greater than a digital representation of said predefined difference.

13. The apparatus of claim 11 wherein said transmitting means comprises means for calculating said adjustment information in response to said designation of said one of said optical units and said sample of said output of said one of said optical units.

14. A method for adjusting outputs of optical units interconnected to an optical repeater via a common optical communication path and said optical units communicate with each other via said common optical communication path and said optical repeater, said method comprising the steps of:
   sampling by said optical repeater outputs of said optical units;
   calculating by said optical repeater an average for the sampled outputs of said optical units;
   comparing by said optical repeater the samples of said outputs with said average; and
   designating by said optical repeater one of said optical units for adjustment upon the difference between said sample of an output of said designated one of said optical units and said average exceeding a predefined difference;
   transmitting by said optical repeater to said designated one of said optical units adjustment information for controlling the output level of said designated one of said optical units.

15. The method of claim 14 wherein said comparing step comprises the steps of:
   converting each of said outputs to an individual digital word; and
   averaging the digital words to form a digital average;
   testing the difference between each of said digital words and a digital average for being greater than a digital representation of said predefined difference.

16. The method of claim 14 wherein said step of transmitting comprises the step of calculating said adjustment information in response to said designation of said one of said optical units and said sample of said output of said one of said optical units.

* * * * *